July 7, 1959  H. L. GRIFFIN  2,893,871
AGGLOMERATION PROCESS AND APPARATUS
Filed Nov. 12, 1958  3 Sheets-Sheet 1
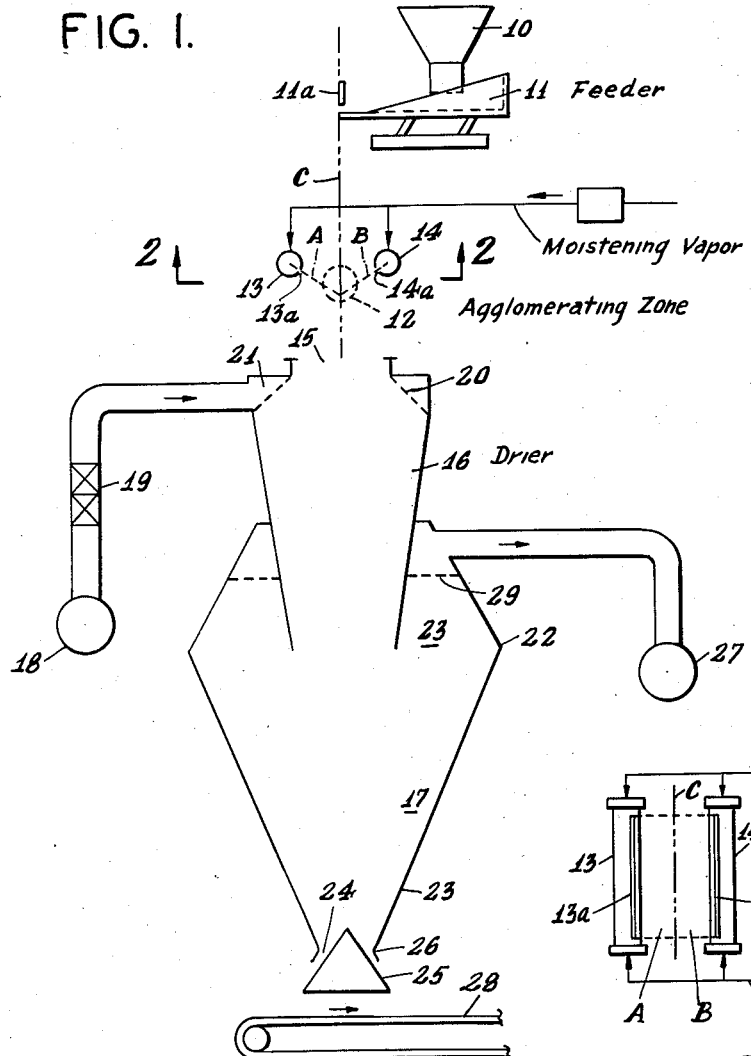
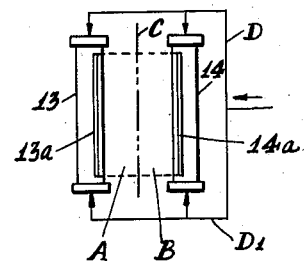
INVENTOR.
HARRY L. GRIFFIN
BY
Davis, Hoxie, Faithfull & Hapgood
his ATTORNEYS.

July 7, 1959     H. L. GRIFFIN     2,893,871
AGGLOMERATION PROCESS AND APPARATUS
Filed Nov. 12, 1958     3 Sheets-Sheet 2
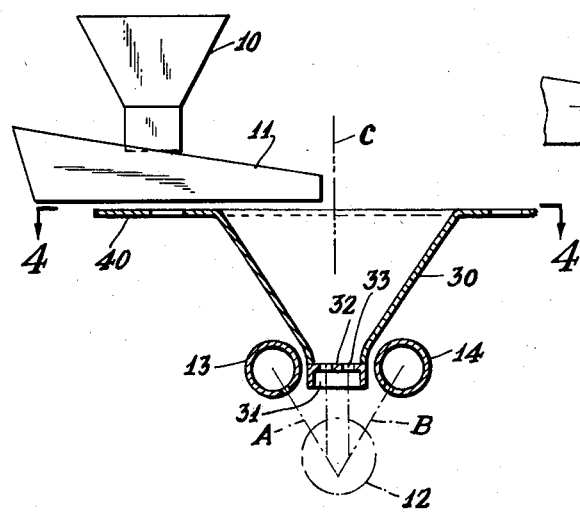
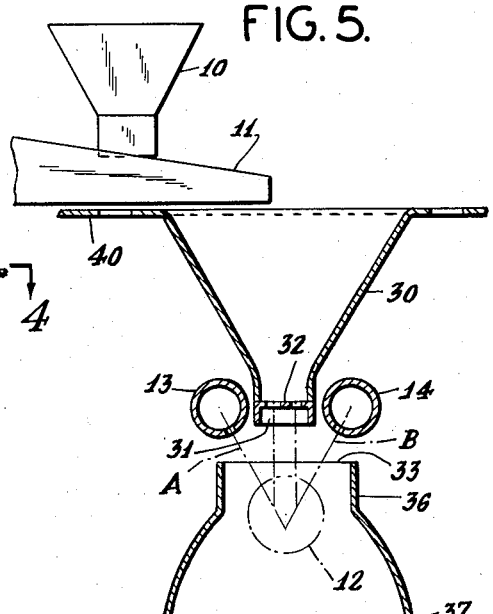
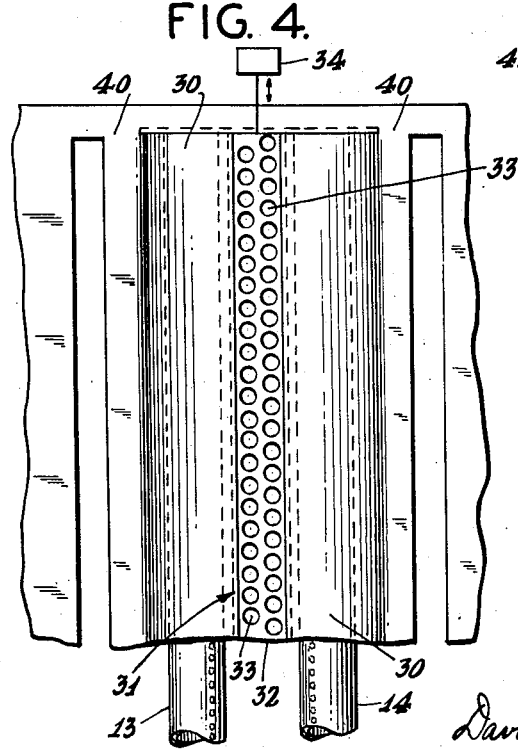
INVENTOR.
HARRY L. GRIFFIN
BY
Davis, Hoxie, Faithfull & Hapgood
his ATTORNEYS.

July 7, 1959 H. L. GRIFFIN 2,893,871
AGGLOMERATION PROCESS AND APPARATUS
Filed Nov. 12, 1958 3 Sheets-Sheet 3
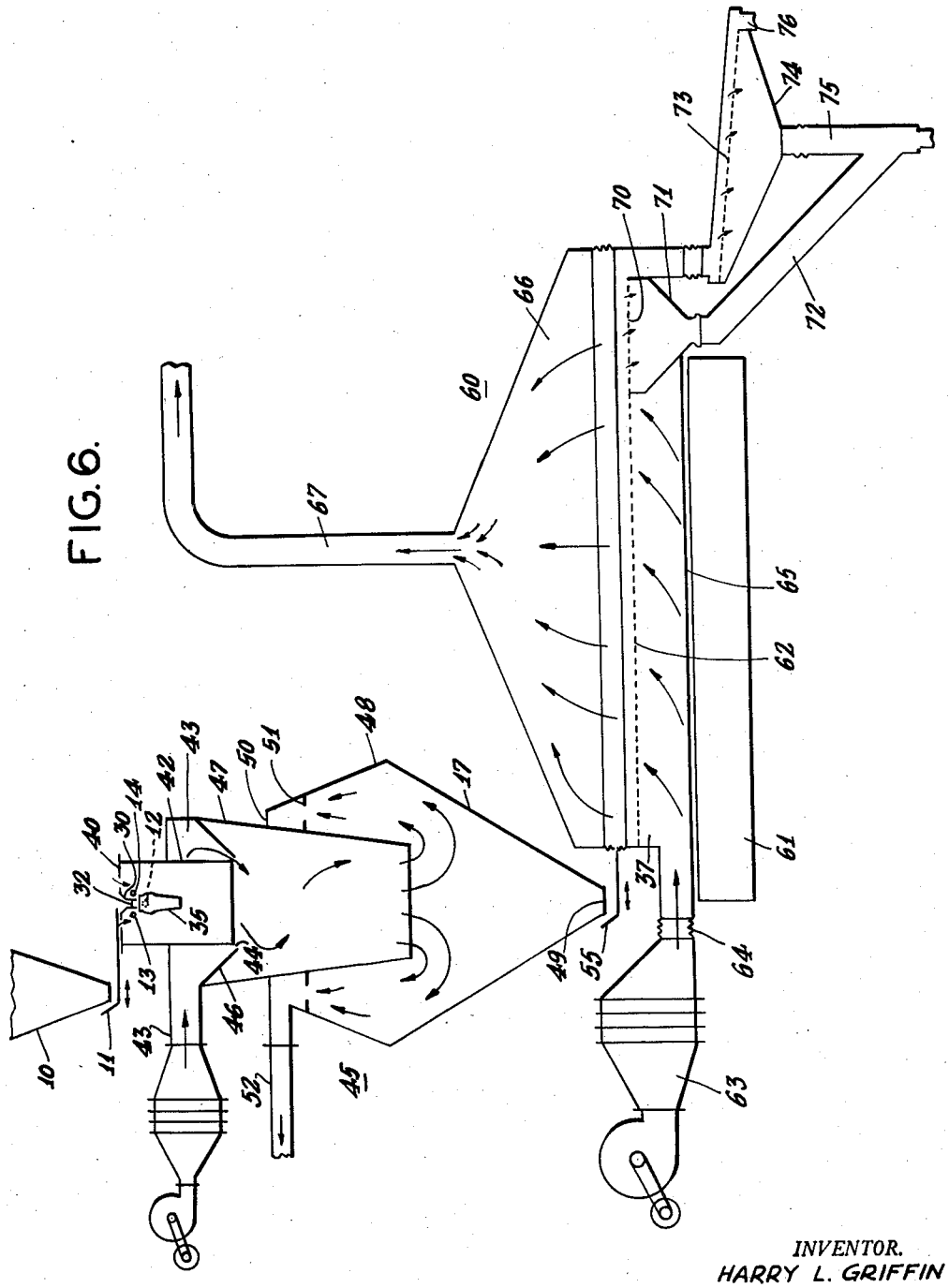
INVENTOR.
HARRY L. GRIFFIN
BY
Davis, Hoxie, Faithfull & Hapgood
his ATTORNEYS.

United States Patent Office 2,893,871
Patented July 7, 1959

2,893,871

AGGLOMERATION PROCESS AND APPARATUS

Harry L. Griffin, River Edge, N.J., assignor to Blaw-Knox Company, Pittsburgh, Pa., a corporation of Delaware Application November 12, 1958, Serial No. 773,387

23 Claims. (Cl. 99—56)

This invention has to do with a process and apparatus for converting certain powdered materials into agglomerate products which are of lower bulk density and are capable of more rapid solution or dispersion than in the powdered form. The powdered materials so converted are those which become self-adherent at their surfaces when the surfaces are moistened. Examples are found chiefly in the field of organic materials including food products, such as milk powders produced by drying skim milk, whole milk or malted milk, powdered cocoa, powdered food mixes such as for cakes and pancakes, and various other foods in powder form, such as baby foods, having a content of milk, sugar or other agglutinant making them susceptible to the new treatment.

In the case of milk, for example, the conversion of the powder to the agglomerated state makes it possible to reconstitute the milk more rapidly than with present commercial products upon immersion in water. The same improvement is obtained in essentially the same degree with most materials of the class described, and in any case the material when thus put into agglomerate form can be reconstituted (if a dehydrated material) or can otherwise be put into solution or dispersion more rapidly than can the powdered form of the same material.

Figs. 1 and 2 in the accompanying drawings, to which reference is made, are schematic diagrams of a suitable form of the novel apparatus of this invention, the construction details of which are conventional and need no description.

Fig. 3 is a section showing a modified feed device.

Fig. 4 is a top plan view of the same modified feed device.

Fig. 5 is a sectional view of a modified form of equipment at the agglomeration zone, showing its relation to the modified feed device.

Fig. 6 is a schematic diagram of the agglomeration unit, with both the feed and agglomeration modifications, and an associated drying unit not novel in itself.

The process is described with particular reference to the treatment of dried skim milk, with sufficient description of process variables and their determinants to enable skilled persons to employ the process and apparatus with other materials of the subject class.

*Apparatus Example I*

Referring to Fig. 1, the powder to be treated is fed continuously from an overhead hopper 10 to a horizontal vibrating feeder 11 which spills from its forward edge into the agglomerating zone 12 below. The vibrator is electrically driven in known fashion, its motion being horizontal. The powder falls in a thin, straight-line, sheet-like stream. In one form successfully used, the straight-line feeder edge from which the powder spilled was 6 inches wide and was provided with a vertically adjustable gate 11a to control the size of the orifice above the spill-over edge, thereby to control the thickness of the free-falling sheet.

The agglomerating zone 12 requires no housing provided the ambient air is sufficiently clean and quiet. Just above it and equally spaced on either side of the plane in which the powder falls are two parallel steam pipes 13, 14, horizontally disposed and parallel to the said plane, having longitudinal slit orifices and forming nozzles 13a, 14a. These nozzles receive low pressure steam or other moistening fluid from a common source by way of lines shown diagrammatically in Figure 2. They deliver two thin sheet-like jets A and B of the moistening vapor downwardly at an angle from opposite sides of the vertical plane C in which the powder falls. These nozzles are shown in enlarged view in Fig. 1, and are further shown in Fig. 2 as seen from beneath to disclose the slit orifices. Ordinarily, the nozzles are from 2 to 4 inches apart, on centers, and are formed of ½-inch (nominal) standard pipe, with steam supplied preferably at both ends by lines D, D' to get a more uniform discharge over the length of the slit orifice.

The two converging jets A and B collide at the vertical plane C or, in other words, the powder falls into the apex of the V-shaped space or trough between these opposed but converging and colliding jets. After passing through this zone of collision, the solid product falls a short distance through the air at substantially room temperature before entering a top opening in a drying unit below.

The drying unit has its top opening or inlet 15 directly beneath the jets, and the opening is large enough to receive the falling solids, being some 12 inches in diameter when the powder is fed in a stream of the order of 6 inches in width. The inlet 15 is spaced several inches below the jets so that there is a short but clear zone through which the solids fall before reaching the drier, after leaving the zone of collision of the jets.

The drying unit consists of a generally cylindrical, slightly converging, drier proper 16 together with a surrounding housing 17, both being arranged on a vertical axis. Warm air is delivered to the drier at the top from a blower 18. A steam or other suitable heater 19 is located in the supply duct beyond the blower 18. An inclined inner perforated plate 20 of annular form is mounted at the top of the drier and forms an annular distribution chamber 21 into and around which the warm air flows and from which it passes down through the perforations into the drier proper, enveloping the solid material entering through the top opening 15. There are no baffles or obstructions in the drier 16, and the solids pass through as a freely falling body.

Surrounding the lower half or so of the drier unit 16, and extending below it, is a housing 17 having an enlarged section 22 opposite the lower end of the drier 16, and having a converging or hopper bottom 23 with an annular solids outlet 24 formed between the steep inverted cone 25 and the rim of the opening 26 at the hopper bottom. The upper part of the chamber 23 thus formed around the drier 16 is connected to an exhaust blower 27. Warm air issuing from the bottom of the drier 16, and containing the moisture taken up from the falling solids, is drawn gently to the exhaust, while solids similarly issuing fall to the outlet at the bottom which delivers to any suitable collection means such as a bin, car or conveyor belt 28. There is a perforated plate 29 across the annular chamber 23, just below the air outlet, to provide better distribution of the air. Entrainment is minimized by the fact that the enlarged flow space provided by the housing 22, as compared with the drier 16, causes a sharp reduction of velocity and thus promotes separation of solids from air. Any residual solids that remain in the effluent air may be removed by a cyclone separator, bag filter or other known means.

Process example

Dried skim milk powder, conventionally prepared by spray drying in the manner of a "low heat" product for drinking, and having a moisture content of the order of 2.5% to 3.5%, is fed from the feeder at the rate of about 750 pounds per hour, in a thin sheet-like stream about 6 inches wide and about ⅛ inch in thickness. The steam nozzles 13, 14 are on centers 2 to 4 inches apart, and their slit orifices, about 7 inches long and 0.006 inch wide, are directed downwardly at an angle of about 40° from the central vertical plane. The two jets thus are about 80° apart. The steam supply is at a pressure of from 2 p.s.i.g. to 5 p.s.i.g., and usually at 4 to 5 p.s.i.g. with an orifice of the size stated. The steam is commercially dry, and is maintained of uniform quality by being passed through a body of water in known manner. The rate of supply is about 28 pounds per hour, expressed in water equivalent. The steam supply is such that the two jets are of equal force, and are balanced, so to speak, so that neither dominates when they collide. The collision of the jets produces a turbulence.

The milk powder falling into the zone of turbulence where the two sheet-like jets collide is subjected to two actions. The particles are superficially moistened by condensation of a portion of the steam, as well as by contained moisture in the steam; and at the same time they are tumbled about, while remaining largely in a confined zone affording intimate contact, with the result that they adhere together in clusters or agglomerates. All but an inappreciable portion of the particles are thus agglomerated.

The agglomerates fall through the air space—some 6 to 10 inches—between the line of collision and the top of the drier. The precise action occurring in this stage is not fully known, but is believed to involve a cooling and setting or further agglutination of the agglomerates prior to their admission to the warm air of the drier. The production of good agglomerates involves a time factor, and this stage between the zone of turbulence and the drying provides that factor, supplementing the brief dwell in the zone of turbulence.

The drying is done under mild conditions of temperature and flow rate, and with the agglomerates falling freely without baffling. The inlet air in the illustrative case of treating dried milk is from about 120° to about 185° F., being less warm when less moist, and the outlet air is about 100° to about 160° F. The usage of air is from 400 to 500 cubic feet per minute, where the drier 16 has a diameter of about 3 feet and a length of about 4 feet. The supply and exhaust blowers are operated to maintain a pressure approximately equal to atmospheric at the solids inlet 15 of the drier, so that there is little or no flow of warm air outward or of cool air inward. There is inflow of air at the solids outlet 24, which cools the effluent agglomerates.

The process variables require no extensive change when the process is employed with other materials which it is capable of agglomerizing by reason of their capacity for becoming self-adherent when superficially moistened. Its key step is the combined moistening and tumbling in a zone of turbulence which confines the powder particles so as to afford intimate contact in their turbulent state, that zone being created when a powdered material is fed into the bottom of the trough formed by two converging and colliding low pressure jets of moistening fluid.

The width of the jets (about 7 inches in the example above) can be increased or decreased to vary the throughput of the unit, since the action is the same in any unit of length beyond the minimum which is economically feasible. The sheet-like form of the stream or jet is best. Moistened warm air or other compatible fluid, capable of releasing its moisture upon contact with the cooler powder, can be used in place of low pressure steam having that same capability; but the process is more readily carried out with steam because of the relative ease with which steam is made available and is held uniform in quality. Water jets can also be used, but in such case the jets are much thinner through use of narrower nozzle slits. I include all of these jet media within the term moistening fluid, since generically the process can be carried out with any fluid medium which releases moisture to the powder to moisten the surfaces of its particles while producing, through the collision of converging jets, the condition of confined turbulence and intimate contact.

The optimum feed rate of the powder and of the moistening vapor, as well as the optimum angle of incidence of the jets, vary somewhat with different powders according to their differences in density, moisture absorption and requirement of moisture for good adhesion. A slower feed of powder or a higher supply of moisture is used where more moisture absorption is needed or where absorption is slower. The angle of incidence is variable from about 15° to about 45°, in terms of angular departure from the central plane along which the powder is fed. Variation of angle or of the feed rates varies the bulk density of the product. The optimum condition is one with which the powder is tumbled sufficiently well and long to get the desired agglomeration, and is recognizable as one with which there is neither upward tossing of the particles to such extent that they are freed from th ezone of collision and are dispersed, as occurs when the angle is too great, nor direct passage of any substantial number of particles through the zone of collision, without sufficient moistening or tumbling, as occurs when the angle is too small.

The significance of the angular relation of the jets will be plainer upon consideration of two extremes which bring about no useful amount of agglomeration. If the jets are 180° apart, so that they collide "head on," there is strong turbulence but particles fed into the zone of turbulence are largely dispersed upwardly and outwardly, and do not return to the zone to receive enough moisture and close enough contact to effect agglomeration. On the other hand, if the angle between the jets is too small, so that they are nearly parallel, there is too little turbulence when they come together and the particles are swept through without being moistened and tumbled in close relation so as to be predominantly converted into agglomerates.

It is my discovery that at intermediate angles the particles are sufficiently moistened superficially, and are tumbled about sufficiently in a confined zone of turbulence affording intimacy of contact, so that a predominant proportion of them are agglomerated to yield a bulk product having improved properties derived from its predominantly agglomerate form; and that this condition of predominant agglomeration can be effected by the use of a low pressure moistening fluid, the jets of which supply the small amount of moisture needed while also providing, through their collision at these intermediate angles, the confined zone of turbulence affording also the intimacy of contact that causes the moistened particles to adhere to one another in clusters to a predominant extent. The condition yielding good results is one in which the particles appear as if boiling, without boiling over, in the zone where the sheet-like jets collide. The steam jets themselves are scarcely visible as they emerge but show some condensation from passage through the air. There is little or no visible vapor escaping from this zone as uncondensed or unused steam.

The nozzles 13, 14 can be mounted so as to be horizontally adjustable to vary their spacing, angularly adjustable to vary the angle of incidence of the jets, and vertically adjustable to permit variation of the space between the nozzles and the drier inlet 15. In general, the gap between the line of collision and the drier top is 6 to 10 inches, and an optimum spacing for each set of conditions is readily found.

The solid material takes up very little moisture in the agglomerating step, something on the order of half a percent and only superficially; but it usually is desirable to remove it by a current of air or compatible gas having the appropriate capacity for moisture absorption. Under some conditions, this air current need not be heated. The product removed from the drier has substantially the same moisture content as the starting powder. Where the added moisture is unobjectionable, the air-current drying may be omitted; but in such case the free fall of the agglomerates through ambient air is desirably made considerably longer than the gap above the drier, this being to permit them to become well set and to lose any surface tackiness by passage through the air. In such case a housing is desirable.

I have found that my process has a further capability and advantage in treating powdered materials consisting of two or more component substances which are desirably put into intimate admixture. An example is a mixture of sugar and cocoa. The two components may be fed separately into the plane C from two opposed feeders, or may be coarsely mixed and fed as a single body. In either case, when the falling sheet reaches the zone of collision of the sheet-like jets the resulting tumbling of the particles effects a very intimate mixing.

In other cases of mixed materials, as in the case of malted milk, it is possible to effect the mixture while one or more components are in the liquid state and before it is dried to a powder form. A malted milk powder so prepared has been agglomerated with notable success by my process using the novel apparatus described above and assentially the same feed rates and jet angle described for the case of skim milk powder. The mixing of malt and milk powder may however be effected in the agglomerating step itself, by the action of the colliding jets. The easy and rapid solution or dispersion of an agglomerated product composed of malt and milk powder makes it possible to prepare a malted milk beverage at the point of use by simple addition of water to reconstitute the liquid milk.

A further advantage of my process and apparatus is that throughout the passage of the material from the feeder to the conveyor, or while it is in a superficially sticky condition, the material in process does not come in contact with any metal surfaces. This not only minimizes the possibility of contamination but also the necessity of cleaning the equipment, and is of especial value and importance in dealing with food or pharmaceutical products for human consumption.

*Product example*

Except for the agglomeration, the milk or other material thus treated undergoes no material change of either a physical or a chemical nature so far as I have been able to find. The heating in the drier is so brief and mild as to have no appreciable effect other than the removal of the added moisture, and there is no material net change in moisture content in the overall process.

The thus agglomerated product meets the requirements of a commercial product. It is sufficiently free-flowing and free of fines for purposes of handling and packaging. While the agglomerates are relatively fragile as compared with some single-bead, unagglomerated products, they maintain themselves adequately in handling and in packaging if reasonable care is taken to avoid long continued or often repeated agitation; and they do so similarly in shipment if the packages are well filled. The bulk density is low.

When reconstituted with water, the thus agglomerated milk product presents striking advantages over the conventional powdered milk and also over the special products now marketed. The product disperses quickly in water. If not stirred, it forms a thin custard-like mass at the bottom of the container, but this mass is readily penetrated by water so that complete solution occurs in a matter of minutes; where the comparison products, forming a sticky mass which often remains dry in the interior, are much more slowly penetrated and do not dissolve without stirring within any feasible time. If stirred, either immediately or after a time, the product of this new treatment goes into solution more rapidly than the comparison products, and so rapidly as to qualify as an "instant" product, requiring only brief stirring. Once dissolved, it remains so. The taste of the reconstituted milk is also better and more nearly like a fresh milk than any I have known before; and is described by many as being that of fresh milk.

The improvement of the product in respect of rapidity of its passage into solution, or of its dispersal into fine suspension if it is an insoluble material such as cocoa, has been demonstrated with a variety of materials of the class described. As yet however I have not learned the full principle of action that is responsible for the behavior of the agglomerated product in solutions or suspending liquids, and I therefore can define the product only in terms of the agglomerating process which produces it.

I am able to describe the bulk product partially, to the extent that its physical state is apparent to the eye under moderate magnification and its behavior in liquids is observable. The clusters are of irregular size and shape, and in form resemble irregular clusters of grapes. The component particles are not compacted into a solid pellet but are in surface contact, with large inter-spaces. When immersed in the solvent or suspending liquid, the clusters are readily penetrated and the bonds are broken, and the particles disperse freely and either dissolve or go into fine suspension, as the case may be, without any tendency to unite in a thick mass. In the absence of stirring, the particles settle and form a thin custard-like mass which contains a large proportion of liquid and is readily re-dispersed, and which in the case of immersion in a solvent proceeds to dissolve at a relatively rapid rate even without being mechanically dispersed.

*Example II*

By making certain modifications or additions at the feed or the agglomerating steps, or both, the product can be made even better in respect of the mechanical strength of the aggregates and the percentage of relatively large aggregates. Further, by making possible the production of larger and firmer aggregates as the immediate product of the agglomeration, which are oversize relative to the desired maximum size in the end-product, there is a readier control of the aggregate size and resulting bulk density of the end product through mechanical breakup of the intermediates into smaller aggregates in the course of finishing operations, which may include after-drying and screening. The basic apparatus and process already described are still employed.

One of these modifications and apparatus attachments causes the addition of somewhat more moisture to the product in total, and therefore makes it preferable in many instances to remove moisture in an after-drier in order to assure against caking; but this increment of moisture can be kept small, raising the total moisture to no more than about 5 to 5.5%.

Figures 3 and 4 show an attachment for delivering the sheet of powder to the agglomerating zone 12 in a modified form of sheet presenting a greater superficial area to initial contact with the moistening jets and causing more of the particles to be superficially moistened. The powder is fed continuously from the overhead hopper 10 to a horizontal vibrating feeder 11 which spills from its forward edge as in Figure 1. Below the feeding tray 40 is a downwardly converging hopper 30 ending in a rectangular throat 31 extending along and between the nozzles 13, 14. The orifices in these nozzles, instead of being slits, may be in the form of a row of closely spaced small holes of diameter less than the wall thickness of the pipes forming the nozzles, so as to project a row of subjects which merge to form the sheet-like jet or moistening fluid. A horizontal forming plate 32 is mounted in the throat 31, and constitutes the functionally significant component, the hopper being incidental to it.

In the embodiment shown in Fig. 4, there are perforations 33 in this plate, preferably of circular shape, which are arranged in two closely spaced parallel rows along the longitudinal axis of the plate 32, and the perforations in adjacent rows are in staggered relation to each other. The rows are symmetrical about the central plane C. The powder falling from the feeder 11 accumulates to some extent on the perforated plate, but there is a continuous flow downward when the plate or the plate and hopper are vibrated. The powder issuing from the perforations in the plate 32 falls as a sheet-like stream composed of cylindrical rods of slightly smaller diameter than the perforations owing to the usual constriction incident to passage through an orifice. In their staggered spaced relation the rods overlap, so to speak, since the space between rods in the direction of any one row is not greater than the rod diameter, and preferably is less. The falling sheet therefore presents a substantially continuous wall of powder to the balanced converging jets.

In one form successfully used, a plate ¾ inch wide was provided with two rows of holes of 5/16 inch diameter each, the rows being located on center lines spaced by ⅜ inch. The holes in each row were spaced ⅜ inch on centers. The hopper 30 in this instance had a top opening 3¾ inches wide, measured at right angles to the plane C. Its length in the direction of that plane was slightly greater than that of the nozzle orifices, and its over-all height was about 2¾ inches.

The thickness of the free-falling sheet may be controlled by the number of rows of perforations, the size of perforation and the spacing between rows. Whatever number of rows are used, the sheet should be thin relative to its length to permit ready access of moisture to the particles from the jets and intense tumbling upon impact of the jets.

The hopper 30 and forming plate 32 are preferably vibrated at a frequency of the order of several hundred cycles per minute and with an amplitude of the order of a few thousandths of an inch, to promote free flow of the powder. Any suitable vibrator may be used, as indicated at 34.

The effect of forming the down-flowing sheet into parallel rows of staggered rod-like bodies, as described, is that a larger surface area is exposed to immediate contact by the sheet-like steam jets, while still presenting a wall of powder to each jet because the rod-like bodies are so spaced and staggered that there is no clear straight-line path through the sheet of powder in the direction of the jets. The jets impinge on the rod-like bodies of powder on their sides as well as on their front areas directly confronting the jets. The chief effect is that the powder mass is more uniformly moistened, in the sense that a higher percentage of the particles are superficially moistened in a way to make them mutually adhesive. There is also some improvement in the agitation of the mass in that the rods are struck tangentially as well as squarely by the jets. The precise action is not known in detail but the end result is that more particles are moistened so as to be well susceptible to agglomeration and form large aggregates. With this attachment alone (i.e., the perforated plate with its hopper) added to the Figure 1 form, the agglomerated product has a higher percentage of relatively large aggregates and the aggregates are somewhat firmer. The maximum aggregate size is not significantly different, but a larger part of the mass is in the form of aggregates of maximum size or close to it.

The falling sheet may be given other cross-sectional shapes which provide an increased lateral surface area per unit of vertical length exposed to the initial impingement of the moistening jets, as compared with an unmodified sheet of rectangular cross-section presenting flat sides to the jets, while still preserving an over-all sheet-like form presenting a substantially continuous wall of powder to the balanced jet action. This may be done either with or without division of the powder into suitably related spaced bodies. A single orifice for example could form fluted or reeded or serrated side surfaces in an undivided sheet of powder. A convenient means to this end is to use a forming plate having one or more orifices of a shape corresponding to the desired horizontal cross-section of the falling sheet of powder. The arrangement of circular perforations here shown as an illustration is believed to give an optimum form for simplicity and effectiveness.

Figure 5 shows a further modification or attachment in the form of a housing 35 for the agglomerating zone. As described above in relation to the Figure 1 form, the converging balanced jets impinging on the falling sheet of powder create a confined zone of turbulence in which the powder particles are superficially moistened and tumbled about with the formation of aggregates as they come into contact with one another. Although not sharply bounded, the existence of this zone is visible as a teeming or "boiling" mass swelling around the apex of the jet trough where the jets converge into the falling sheet of powder, with downward flow of solids below in a still sheet-like but more thickened or swollen form. Some of the particles however escape from this primary zone into the surrounding space. Although only an appreciable part escapes without any agglomeration, an appreciable fraction escapes as strays before forming into agglomerates of the size of those formed from the particles which dwell temporarily in this confined zone before falling directly down from it. Although it is not necessary to the creation of a useful end-product, it is desirable in some cases, and especially with a skim milk product, to cause a larger percentage of the total powder to be formed into such larger aggregates.

To do this, and also to form still larger and firmer initial aggregates, yielding firmer aggregates in the end-product, I provide confining side walls on opposite sides of the falling sheet of powder, below the jets, to prevent the lateral dispersion of this stray fraction of the mass, preferably confining the whole mass to a zone of roughly circular cross-section around and below the convergence of the jets; and I carry these side walls down several inches in converging relation to form a constricting throat in which the falling sheet, swollen in thickness by the agglomeration in the primary zone is constricted in thickness whereby larger and firmer aggregates are formed.

In the main, this action in the throat prolongs the agglomeration. It appears to consist of a supplemental step of agglomeration, setting and mild compacting, in which aggregates initially formed above in the primary zone around the apex are further agglomerated into larger "popcorn" like aggregates. A large part of the emerging thickened sheet is in aggregates ranging from 1/16 to ½ inch in size. By reason of the compacting of the whole by the side walls these aggregates are not only larger but are firmer. The advantage is first that, since many of these aggregates are over-size in relation to a desirable maximum size of aggregate in the end-product, they afford leeway for a controlled partial break-up in a finishing operation to bring the mass as desired to any of several different maximum sizes of aggregate, giving different bulk densities for the end-product. This also yields a larger content of aggregates of that maximum size or near to it. Further, the aggregates formed by break-up of these over-size aggregates are firmer and better maintain themselves against breakage in packing and shipping. They nevertheless have ample porosity to give quick dispersal in water so as to qualify well as an "instant" product. This is not to say that the immediate product here referred to as over-size is not a useful product, but only that these initial aggregates are so large that the bulk density is lower than is usually desired commercially. It would create too large a package for any unit weight commonly sold, and would increase shipping costs.

Structurally, the housing 35 is preferably of the sectional shape shown. In the direction at right angles to the section shown, it extends for a length slightly longer than the corresponding dimension of the falling sheet of powder, and equal to the corresponding dimension of the hopper 30. Considering the shape of its side walls, as shown in the sectional view, it has an upper collar portion 36 having vertical walls; below that a portion 37 having an outwardly bowed or convex side wall on each side at and below the level where the jets collide with the falling sheet of powder; and below the bowed portion, it has a converging skirt portion 38 forming the constricting throat 39. End walls, if provided, may be flat, as there is little endwise extension of the primary zone of turbulence at the ends of the falling sheet of powder, the principal swelling being lateral under the action of the colliding jets.

The collar portion 36 has a width—or spacing between its side-walls—approximately double that of the perforated plate, or in other words such a width as to place its side-walls clear of the falling sheet of powder. In an example where that plate was ¾ inch wide, the collar width was about 2 inches and its height was ¾ inch. It contains the upwardly swelling part of the mass of agglomerating powder.

The outwardly bowed portion 37 has a maximum width which may vary somewhat but at its widest is approximately five times the width of the perforated plate or, in other words, several times the thickness of the falling sheet as it is prior to collision with the jets. Preferably, it does not materially constrict but simply contains the initially swelling sheet in the shape it naturally assumes under the action of the balanced converging jets, while preventing lateral dispersion of the small fraction that tends to stray. In the same example, it was about 4 inches wide at maximum, each bowed wall being on the arc of a circle of 3 inches radius having its center on the opposite side of and spaced 1⅛ inches from the vertical center plane, and 2⅛ inches below the lower end of the collar 36. The bottom width of this bowed portion is preferably slightly wider than the width at its top. Variations from these proportions are possible to vary the degree of confinement, without of course destroying the primary zone of turbulence, the main objects providing the design criteria being to prevent scattering of the small "stray" fraction of the powder that otherwise does not enter into a sufficient contacting action, and in the throat 39 to constrict the swollen sheet in thickness and compact the aggregate mildly to promote to a larger size with firmer bonding within the aggregates.

The converging skirt portion 38 in the example cited was about 5 inches in height and ended in a mouth of approximately the same width as the width of the collar or top width of the bowed portion. In the same example, it was about 2 inches in width. Its width relative to the width (thickness) of the swollen sheet-like mass falling from the primary zone should be such as to constrict the flow slightly and so compact the mass mildly, without pressing it into a single mass but enough to produce larger and firmer aggregates. These confining side walls on opposite sides of the falling sheet undergoing agglomeration enhance the action described above in relation to the apparatus form of Figure 1, in which a short gap is provided between the agglomeration zone and the entrance to the drier 16.

The use of this attachment 35 involves contact of the powder with metal surfaces, an effect avoided in the Figure 1 form but a necessary incident of the described improvement in product quality. This contact with the walls of the attachment creates some tendency of the moistened material to "hang" on the walls. This is minimized by the outwardly bowed shape at the primary zone of agglomeration, as compared with the effect of parallel or upwardly diverging walls which do not conform well to the natural configuration of the swelling of the sheet in thickness in that zone. Any residual tendency of the material to hang in that zone is eliminated if the attachment is vibrated at high frequency, with a very small amplitude; and I prefer to use a suitable vibrator indicated schematically at 41, the nature and point of application of which are matters of choice in the particular case, such devices being well known. In the throat section 39, where the thickened sheet is gradually constricted, there is contact with the side-walls and a damming effect incident to the constriction in thickness and the compacting. This causes some inconsequential irregularity of flow of the agglomerated sheet from the attachment. By varying the proportions, this constricting and compacting action can be initiated higher up, in the lower part of the outwardly bowed section 37, but I prefer to separate the two effects in large degree, letting the bowed section serve chiefly to contain the strays and the throat section serve chiefly to constrict and compact the entire mass.

As in the Figure 1 form, it is desirable to subject the agglomerated mass immediately to mild drying in a current of warm air as it falls. Figure 6 shows such a unit in its relation to the two attachments described, and shows also an optional after-drier which is used when the forming unit 32 is used and when it is desired to remove all of the added moisture. The first drier, corresponding to drier 16 in Figure 1, is of a type that is not well adapted to the removal of all of the larger increment of moisture added when this attachment 32 is used, since such a unit would then involve undesirable temperatures or velocities or both in the drying air stream. The after-drier therefore is used when it is desired to assure fully against caking of the end-product in storage. Presently, the prevailing standard is to hold the moisture content of the end-product to around 3% in the case of a milk product, and in that event an after-drier is needed. However some believe that a moisture content of 4% or even 5%, is tolerable, and when that fixes the standard the process can be conducted without an after-drier. In any event, the after-drier is relatively simple as compared with that required with less efficient agglomeration processes in which the amount of moisture added to the material is several times greater and is such as to make it imperative to use an after-drier, and one which is substantially larger and more costly, in order to meet the same end-product specification as to moisture content.

As shown in Figure 6, the first drier 45 is like the drier 16 of Figure 1 in the main, but differs in having an extra housing 42 (preferably cylindrical) surrounding the nozzles 13, 14 and the agglomeration zone, and extending up to the plate 40 around the top of the feed hopper 30 carrying the forming plate 32. Warm air delivered through the line 43 circulates in an annular chamber 44 surrounding the lower half or so of this housing 42, thereby warming the zone within through which the sheet of agglomerated material falls after emerging from the constricting throat 39 of housing 35. The warm air passes downward from the annular chamber 43 through an annular passageway between the inner edge of a downwardly inclined annular partition 46 and the lower rim of housing 42, into the main drying zone formed by the inner shell 47. The shell 47 opens at the bottom to the enlarged mid-portion of the outer shell 48, which converges downwardly to the bottom outlet 49 and upwardly to a top wall 50 above the perforated horizontal partition or screen 51. The outlet line 52 for the discharge of air carrying the absorbed moisture is above this partition 51.

At the bottom is shown schematically a horizontal vibratory feeder plate 55 which delivers to the right onto the screen of an after-drier 60 of known type. This drier has a base unit 61 carrying the operating drive for the vibratory horizontal-feeding screen 62, below which heated air is delivered from a blower-heater unit 63 through a line having a flexible coupling 64 to isolate the blower-heater from the vibrations of the screen and its housing 65. A suitable form of drier screen 62 is one formed of closely spaced parallel wires, extending from left to right as shown, and given an upward, forward and reverse motion to cause material to flow along it to the right. The warm air passes through the screen 62 and its burden of travelling material fed in at the left, and thence to a hood 66 above from which it is discharged by line 67.

At the right hand end, beyond the drying screen but vibrating with it, is a first sizing screen 70 of mesh type. Agglomerates passing this screen fall into a hopper 71 below, which discharges through line 72. Agglomerates failing to pass through this screen are delivered to the right to a second sizing or scalping screen 73, also vibrated, which delivers under-size material to a hopper 74 and discharge line 75 joining the first discharge line 72, while over-size material is discharged through outlet 76 at the right, for discard, re-run or any appropriate disposition.

The selection and design of this drying and sizing unit is not a part of the present invention, and a suitable form is well known. Its presently notable effect is that the agitation of the agglomerates on the vibratory drier screen and first sizing screen breaks the agglomerates into agglomerates of smaller size. The degree of agitation and break-up can be determined by the size of the unit and the degree of agitation, so as to bring the mass to an agglomerate size and corresponding bulk density as desired, starting with the over-size aggregates formed in the agglomerating zone by action of the attachment 35. Other mechanical sizing practices may be used as well in this finishing operation, with or without accompanying drying. In a properly designed unit of the sort shown, the material discharged at 76 can be held to a very small fraction, and the bulk of the material can be recovered as an agglomerated "instant" product of the bulk density chosen to meet commercial desiderata.

The process and apparatus here described, including the two attachments 32 and 35, have proved to be successful in agglomerating a spray dried whole milk powder, which heretofore has not lent itself to successful agglomeration with retention of good flavor. The present invention is successful also with the powder product obtained when the fat content of superior whole milk is reduced to 12 or 15%. The agglomerated whole milk powder product, or one of reduced fat content, has a natural flavor and has unusual keeping properties, even when stored without refrigeration in ungassed polyethylene containers. When added to water to reconstitute it, this product qualifies as an "instant" product if the water is at a temperature of about 105° or 110° F. With water at room temperature, it does not reconstitute as quickly as the term "instant" connotes in its true sense, as does the skim milk product, but this agglomerated whole milk product is more readily dispersed and reconstituted than is the whole milk product of other agglomeration processes known to me, and its flavor is markedly superior.

This application is a continuation-in-part of my co-pending application Serial Number 500,576, filed April 11, 1955.

I claim:

1. A process of agglomerating a powdered material capable of being self-adherent when superfically moistened which comprises forming two balanced straight-line sheet-like jets of moistening fluid and directing them against each other in converging relation while passing the powdered material in a sheet-like body into the apex of the trough between said jets whereby its particles are superficially moistened and are tumbled in a confined zone of turbulence to form agglomerates by self-adhesion.

2. A process as in claim 1 in which the converging jets are symmetrical about a vertical plane, and the powdered material falls freely along said plane into the zone of collision of the jets.

3. A process as in claim 1 in which the jets are sheet-like and converge downwardly with each jet at an angle of about from 15° to 45° from the vertical plane through their line of collision, the powdered material falling freely along said plane.

4. A process as in claim 1 in which the powdered material is a food product containing milk or sugar.

5. A process of agglomerating dried skim milk powder of moisture content about from 2.5% to 3.5% which comprises discharging two balanced converging sheet-like jets of steam, at a pressure of about 1 to 5 p.s.i.g., downwardly against each other at an angle of about 40° from a central vertical plane, while passing the milk powder in a freely falling sheet-like body along said plane into the zone of collision of said jets, whereby the milk particles are moistened superficially and are tumbled in a confined zone of turbulence to form agglomerates by self-adhesion.

6. A process of producing an agglomerated bulk product from a powdered material capable of self-adhesion when superficially moistened which comprises passing the powder downwardly in a sheet-like body into the apex of the trough between two balanced converging and colliding sheet-like jets of moistening fluid to moisten the particles superficially and form agglomerates, and subjecting the agglomerates to drying to remove substantially the moisture superficially adsorbed from said jets.

7. A process as in claim 6 in which the agglomerates are passed through a short air space at substantially room temperature after leaving the zone of collision of the jets and before being subjected to said drying.

8. A process of producing dried skim milk in agglomerate form which comprises forming agglomerates by the process of claim 5 and then passing the agglomerates as a freely falling body through an air space of 6 to 10 inches and thence through a drying zone to remove substantially the moisture superficially absorbed in the agglomerating step.

9. A process of agglomerating a powdered material capable of being self-adherent when superficially moistened which comprises forming two balanced straight-line sheet-like jets of moistening fluid and directing them downwardly against each other in converging relation while passing the powdered material downwardly into the apex of the trough between said jets in a sheet-like body, whereby the powder particles are superficially moistened and are tumbled to form agglomerates by self-adhesion.

10. A process in accordance with claim 9 in which before contact with said jets the body of powder is formed into a cross-sectional shape giving it non-planar side surfaces of increased area exposed to contact with said jets.

11. A process as in claim 9 wherein before contact with the jets the body of powdered material is formed into a sheet-like body comprising two parallel rows of spaced rodlike bodies of said material so related in position as to present to said jets a wall of falling powder of increased side area.

12. A process as in claim 9 wherein lateral dispersion of stray particles of powder from the zone of contact with said jets is prevented by physical containment on opposite sides of the falling sheet.

13. A process as in claim 9 wherein the said sheet-like body is constricted in thickness and mildly compacted after swelling in the zone of contact with said jets, whereby agglomerates formed in said zone are further agglomerated and more firmly bonded.

14. A process as in claim 9 wherein lateral dispersion of stray particles from said zone is prevented and the said sheet-like body is constricted in thickness and mildly compacted after swelling in the zone of contact with said jets, whereby to enlarge the aggregates and more firmly bond them.

15. A process as in claim 9 in which the agglomeration is prolonged under a condition of mild compacting to form over-size agglomerates substantially larger than the maximum agglomerate size of the end-product, and then reducing the size of said over-size agglomerates by mechanical action to produce a still agglomerated end-product having a substantially smaller maximum size of agglomerate.

16. Apparatus for the production of agglomerates from powdered material capable of self-adhesion when superficially moistened which comprises means for feeding powdered material as a free-falling straight-line sheet, and a pair of parallel spaced nozzles at either side of the vertical plane in which such powder falls, the said nozzles having orifices for forming downwardly directed converging sheet-like jets of moistening fluid to impinge against each other at the said plane.

17. Apparatus for the production of agglomerates from powdered material capable of self-adhesion when superficially moistened which comprises means for feeding powdered material as a free-falling straight-line sheet, a pair of parallel spaced nozzles at either side of the vertical plane in which such powder falls, the said nozzles having orifices for forming downwardly directed converging sheet-like jets of moistening fluid to impinge against each other at the said plane, and a drier having a top inlet opening spaced below said jets by at least several inches, the said drier having a drying chamber below said inlet through which agglomerates formed above can fall.

18. Apparatus as in claim 16 in which there is associated with said drier means for passing a current of warm air downwardly through said drying chamber and laterally out above the solids outlet, and means for promoting gravity separation of solids from said air.

19. Apparatus in accordance with claim 16 in combination with means forming the said sheet-like body of powder into a cross-sectional shape giving it non-planar side surfaces of increased area exposed to contact with said jets.

20. Apparatus in accordance with claim 16 in combination with a means in the path of said sheet above the convergence of said jets to form the powdered material into spaced rod-like bodies so related in position as to present to said jets a wall of material of increased side area.

21. Apparatus in accordance with claim 16 in combination with means forming lateral walls on opposite sides of said sheet at and below the convergence of said jets to prevent lateral dispersion of stray particles in the region of said convergence where said sheet is thickened, and to constrict and prolong agglomeration in the thickened sheet below the said convergence.

22. Apparatus in accordance with claim 16 in combination with a means forming lateral walls on opposite sides of said sheet at and below the convergence of said jets, said walls being outwardly bowed in the region of said convergence and converging there-below to constrict said sheet in thickness after it is swollen by action of said jets.

23. Apparatus in accordance with claim 16 in combination with lateral walls on opposite sides of said sheet at and below the convergence of said jets whereby to prevent lateral dispersion of stray particles in the region of said convergence where said sheet is thickened, and to constrict said thickened sheet gradually in thickness.

References Cited in the file of this patent

UNITED STATES PATENTS

| | | |
|---|---|---|
| 1,928,135 | Peebles et al. | Sept. 26, 1933 |
| 2,016,592 | Chuck | Oct. 8, 1935 |
| 2,174,734 | Chuck | Oct. 3, 1939 |
| 2,832,686 | Louder et al. | Apr. 29, 1958 |
| 2,835,586 | Peebles | May 20, 1958 |

UNITED STATES PATENT OFFICE

CERTIFICATE OF CORRECTION

Patent No. 2,893,871                                                                                      July 7, 1959

Harry L. Griffin

It is hereby certified that error appears in the printed specification of the above numbered patent requiring correction and that the said Letters Patent should read as corrected below.

Column 4, line 28, for "th ezone" read -- the zone --; column 5, line 31, for "assentially" read -- essentially --; column 7, line 2, for "subjects" read -- sub-jets --; line 29, for "part" read -- apart --; column 9, line 52, for "aggregate" read -- aggregates --; same line 52, after "promote" insert -- growth --; column 12, line 33, for "adsorbed" read -- absorbed --.

Signed and sealed this 17th day of November 1959.

(SEAL)
Attest:

KARL H. AXLINE                                                         ROBERT C. WATSON
Attesting Officer                                                   Commissioner of Patents